UNITED STATES PATENT OFFICE 2,389,309

PROCESS FOR REGENERATING EXHALED AIR

Nicolas Herzmark, Indianapolis, Ind.

No Drawing. Application February 2, 1942, Serial No. 429,347. In Great Britain December 3, 1941

10 Claims. (Cl. 23—4)

The invention relates to the regeneration or purification of impure air in a closed space such as the interior of a submarine or of a respirator for fire-fighting or life-saving use and relates more particularly to methods, apparatus and compositions of matter for regenerating or purifying exhaled air in such spaces.

Atmospheric air is formed by about 79 parts of nitrogen and about 21 parts of oxygen. Each respiratory movement of a person absorbs about 20% of the inhaled oxygen and about 17% of carbon dioxide is exhaled. A man doing moderate work absorbs about 22 litres of oxygen per hour and exhales about 18 litres of carbon dioxide plus 35 cubic centimeters of water. The tolerance of the human organism is fairly large, because respiration subsists even in an atmosphere in which carbon dioxide does not exceed 9% and the quantity of oxygen is at least 10%. For persons working in a closed space where ventilation is insufficient, it is necessary to provide for air regeneration which entails supplying oxygen for that absorbed by the lungs and eliminating or changing the exhaled carbon dioxide by chemical reaction.

The additional oxygen required is commonly supplied either by the reaction of alkaline peroxides and water or by oxygen under pressure. Carbonic acid in the exhaled air is commonly neutralized by alkaline hydrates or oxides with which it combines to form carbonates.

The foregoing methods are subject to serious disadvantages since the employment of compressed oxygen necessitates the use of steel containers which are heavy and costly. On the other hand, the alkaline peroxides are sensitive in varying degree to the action of moisture alone so that they give off oxygen in varying degree when exposed to humidity of any kind, irrespective of the presence of carbon dioxide. However, in the presence of moist air containing carbon dioxide, the peroxide granules are humidified and carbonated and hence become covered with a film or layer of carbonate which masks the center of the granule from further reaction and the granules may become agglomerated into blocks which stop the penetration of air into the mass so that the yield becomes exhausted. Accordingly, it is among the objects of this invention to overcome the foregoing disadvantages and to enable the use of substances capable of supplying oxygen in the presence of moisture for the regeneration of air containing carbon dioxide, without the rapid carbonation and consequent decrease in oxygen supplying capacity of such substances commonly accompanying their use for such purpose.

Another object of this invention is to enable the regeneration chemically of a larger quantity of air to be carried out with a given quantity of regenerative material than has been heretofore capable of attainment and to effect the regeneration without the production of any substantial amount of undesirable heat and at a relatively lower cost and with apparatus suitable for use in portable respirators.

A further object of the invention is to provide a new and improved process and apparatus for regenerating or purifying exhaled air through the neutralization of carbon dioxide with a simultaneous production of oxygen, which will permit normal respiration for a more extended period, in an air-tight space.

Another object of the invention is to provide a process of the nature aforesaid through the use of which acid products of the respiration will be neutralized and organic products of the respiration will be oxidized.

Among the advantages of this invention is that hydrogen evolved in a closed space, such, for example, as hydrogen evolved in a submarine from its batteries or, accumulators, will be oxidized into water, through the use of the invention.

Another advantage of the invention is that the chemicals used in mixtures may be current industrial products.

The present invention is based on the following findings:

In suitable proportion, the alkaline persalts, that is, compounds which contain labile oxygen and which after the release of the oxygen leave an alkaline residue, are capable of reacting with soluble permanganates, in the presence of moisture, to produce oxygen. The alkaline peroxides, which term is intended to include the alkali peroxides as well as the alkaline-earth peroxides, may be considered as salts of hydrogen peroxide and hence fall within the category of alkaline persalts. Thus, sodium peroxide reacts with potassium permanganate in the presence of moisture to produce oxygen in accordance with the following typical reaction:

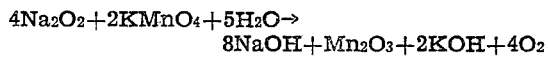

$4Na_2O_2 + 2KMnO_4 + 5H_2O \rightarrow 8NaOH + Mn_2O_3 + 2KOH + 4O_2$

If the soluble permanganates are in smaller proportion, they act as catalyzing agents to assist the evolution of oxygen.

If in this mixture the soluble permanganates are replaced by insoluble manganates, such as manganates of barium, there is no catalytic or other action of decomposition, immediately, but only after the manganates have been changed into soluble permanganates.

Feeble acids, such as carbonic acid, transform the insoluble earthy alkaline manganates into soluble permanganates which, when mixed with the persalts or the alkaline peroxides, then act as above stated. Alkaline peroxides are particularly sensitive to humidity. The humidified granules and carbonates, by the passage of damp carbonated air, become oxidized and covered with a carbonate film which protects the center of the granule, which then becomes insensitive to any reaction. The yield then becomes exhausted.

The earthy alkaline ferrates, very stable in the absence of acids, have a great affinity for carbon dioxide. The ferrates thus are very active neutralizing agents for the prevention of carbonation. When mixed with the persalts, peroxides and manganates they constitute products very sensitive to the action of exhaled air or air containing carbon dioxide.

In accordance with the invention the impure air with its content of carbon dioxide is contacted in the presence of moisture with a novel regenerating and purifying mixture comprising a substance containing labile oxygen and an insoluble manganate which latter is convertible by the carbon dioxide of the air into a soluble permanganate which in the presence of the moisture will (by catalysis or otherwise) cause the evolution of oxygen from the mixture. Suitable oxygen yielding substances are the alkaline persalts such, for example, as sodium perborate, sodium peroxide and barium peroxide. Insoluble manganates which are convertible by carbon dioxide to the soluble permanganate are the insoluble alkaline-earth manganates such, for example, as barium manganate.

In order to effect a fixation of carbon dioxide further to that resulting from the conversion of the insoluble manganate and in order substantially to prevent carbonation of the oxygen yielding substances of the mixture, the mixture also preferably comprises a substance having a very great affinity for carbon dioxide as well as possibly a supplementary catalytic effect to that of the soluble permanganate, suitable substances for the purpose being the alkaline-earth ferrates such, for example, as barium ferrate.

The mixture of active substances in a finely divided state and preferably intimately mixed with porous or fibrous materials such, for example, as asbestos fibres, is carried in a consolidated state in foraminous envelopes such as envelopes of wire gauze or netting, thereby to prevent the active substances from accumulating in a solid mass and forming agglomerates and producing undesirable heat. Suitable pressures for consolidating or compacting the mixtures are in the order of 15 to 20 kg. per sq. cm.

The mixtures of these products may be used to effect the regeneration of exhaled air either by simple contact with the air or by passing the air thereover under the action of fans, blowers or other suitable ventilators. As an example, the following mixtures may be used:

1

| | Parts by weight |
|---|---|
| Peroxide of barium | 25 |
| Ferrate of barium | 5 |
| Sodium peroxide | 50 |
| Manganate of barium | 10 |
| Asbestos fibre | 10 |

2

| | |
|---|---|
| Sodium perborate | 80 |
| Manganate of barium | 10 |
| Asbestos fibre | 10 |

The mixture 2 having a perborate base will be found particularly stable if carbon dioxide is absent. Under the combined action of carbon dioxide and of humidity, this mixture will release its oxygen in neutralizing very little carbon dioxide.

The mixture 1 with a peroxide basis will release its oxygen and will also neutralize a large proportion of carbon dioxide. In practice, the mixtures will preferably be used in conjunction with each other in suitable proportions.

These mixtures can be readily compressed between wire nettings and the frames thus formed disposed in the confined space or in the path or passage of exhaled air or in a pipe or box through which the air is blown.

Tests of the process demonstrate that there is a neutralization of carbon dioxide with the simultaneous production of oxygen which permits long-continued respiration in an air-tight space.

In carrying out the tests an airtight test cabin of iron sheeting having a capacity of 1300 litres was employed. The test room of the cabin was provided with valve controlled tubular means for controlling the introduction and outlet of gases. The cabin was equipped with an airtight access door; with a thermometer with a water manometer formed by a tube of which one branch was connected to the cabin; and with an interior ventilator.

Two frames containing a total of 4.4 kgs. of active fibrous matter slightly compressed, were suspended in the cabin. As active fibrous matter, the mixtures of the foregoing Examples 1 and 2 were employed, the respective frames containing approximately 2.2 kgs. of the respective mixtures.

At 10:30 a. m. the cabin was closed. The thermometer reading was 22° C. 36 litres of carbon dioxide and 60 c. c. (cubic centimeters) of water vapor were introduced while the air was agitated at intervals. At 11:15 the operation was finished. The manometer showed a pressure of 48 cm. of water. Draining was effected and pressure was released until the manometer showed a pressure of 2 centimeters (cm.) of water. The pressure drop of 46 cm. indicated that 60 litres of gas had been removed from the cabin, which 60 litres contained

| | Per cent |
|---|---|
| $CO_2$ | 1.2 |
| $O_2$ | 21.4 |

At 11:25 the interior temperature was 23° C. A further dose of 36 litres of carbon dioxide and 70 grs. of water vapor were introduced into the cabin.

At 12:25 the pressure was 41 cm. and was drained down to 2 cm. and expulsion was carried out. 50 litres of air were emptied containing—

| | Per cent |
|---|---|
| $CO_2$ | 1.2 |
| $O_2$ | 23.2 |

At 12:30 the temperature was 25° C. 36 litres of carbon dioxide and 70 cm. of water vapor were introduced into the cabin and the operation was stopped at 1:20 p. m. The pressure was 63 cm. and, by drawing, reduced to 4 cm. indicating that 77 litres of air had been removed, containing—

| | Per cent |
|---|---|
| $CO_2$ | 1.8 |
| $O_2$ | 27.4 |

At 1:40 36 litres of carbon dioxide and 50 cubic centimeters (c. c.) of water vapor were introduced into the cabin. Operation was stopped at 2:05 with the pressure standing at 65 cm. which was reduced 60 cm., that is to say 78 litres of air were removed containing—

| | Per cent |
|---|---|
| $CO_2$ | 3.2 |
| $O_2$ | 30.6 |

The cabin was left, without being touched or ventilated, until 3:30 and it was found that the pressure had dropped 10 cm., the air removed containing

| | Per cent |
|---|---|
| $CO_2$ | 1.8 |
| $O_2$ | 31.2 |

The temperature reading was 24° C. and at 3:30 p. m. 36 litres of carbon dioxide and 70 cubic centimeters (c. c.) of water vapor were introduced into the cabin. Testing showed—

| | Per cent |
|---|---|
| $CO_2$ | 3.2 |
| $O_2$ | 31.7 |

The cabin was left without addition of carbon dioxide until 5:15. The pressure reading was +6 cm. Testing showed:

| | |
|---|---|
| $CO_2$ | 2.4 |
| $O_2$ | 32. |

Between 5:15 and 5:45 36 litres of carbon dioxide and 60 cubic centimeters of water vapor were introduced and at 6:00 the pressure was +31 cm. Testing showed—

| | |
|---|---|
| $CO_2$ | 4.2 |
| $O_2$ | 32.2 |

The cabin was left without ventilation that is, without agitation of the air in the cabin, until the following morning at 8:45. The vacuum was −6 cm. The temperature was 18° C. Testing showed—

| | |
|---|---|
| $CO_2$ | 0.3 |
| $O_2$ | 34.1 |

Thus it will be seen that over the period of six hours and forty-five minutes from 10:30 a. m. to 5:15 p. m., the cabin was supplied with $CO_2$ and water vapor on five occasions, and the contents of the cabin sampled on six occasions. This constituted the first part of the test period. Following this, $CO_2$ and water vapor were again introduced as above stated, the contents sampled and left at rest for about fifteen hours, that is, from roughly 5:45 p. m. until 8:45 a. m. of the following day, at which time the contents were again sampled.

Determinations of the oxygen yield as well as the quantity of $CO_2$ neutralized during the first part of the test period were made in accordance with the procedure set forth hereinafter under the heading of Case A. Similar determinations for the whole test period were made in accordance with the procedure under the heading Case B.

CASE A

*Oxygen*

At the beginning of the test, the cabin contained 1300 litres of air of which the oxygen content was 20.8% or 270 litres.

At 5:15 the pressure reading was +6 cm. and the temperature had risen 3° C. to 25° C. The pressure reading corrected for temperature change would be 11.4 cm., the difference of 5.4 cm. representing a volume change of 7 litres. Based on this, the cabin was determined to contain 1300 litres −7 litres=1293 litres of which the oxygen content was 32%, or 413 litres.

During this portion of the test, the following amounts of oxygen were discharged:

| | Litres |
|---|---|
| 60 litres×21.4% | 12.8 |
| 50 litres×23.2% | 11.6 |
| 77 litres×27.6% | 21.1 |
| 60 litres×30.6% | 23.8 |
| | 69.3 | which added to the 413 litres in the cabin totals 482.3 litres of oxygen.

Thus, it is apparent that 212.3 litres of oxygen (482.3−270) were evolved.

*Carbonic acid*

During this period 36 litres of carbon dioxide have been introduced at 5 different times, in other words, a total of 180 litres of $CO_2$.

During the same period carbon dioxide was discharged as follows:

| | Litres |
|---|---|
| 60 litres×1.2% | 0.7 |
| 50 litres×1.2% | 0.6 |
| 77 litres×1.4% | 1.4 |
| 78 litres×3.2% | 2.5 |
| The remainder 1293 litres×2.4% | 31.0 |
| Total | 36.2 |

I. e. neutralized, 144 litres.

CASE B

*Oxygen*

At the start of the test as in Case A there were 270 litres of oxygen present.

At the end of the test, the contents of the cabin, at the final temperature (18° C.) and manometer pressure (−6 cm.), amounted to 1300−27 litres of which the oxygen content was 34.1% or 433 litres.

The oxygen discharged as in Case A amounted to 69.3 litres which added to the 433 litres in the cabin totals 502.3 litres of oxygen.

Thus, it is apparent that the total amount of oxygen evolved equalled 502.3−270 litres, or approximately 233 litres of oxygen.

*Carbon dioxide*

| | Litres |
|---|---|
| 36 litres introduced 6 times | 216 |
| Litres discharged as in Case A | 5 |
| Remainder (1273×0.3%) | 4 |
| Total | 9 |

I. e., neutralized 216−9=207 litres.

From the foregoing it will be clear that there is a neutralization of carbon dioxide simultaneously with the production of oxygen which permits normal respiration in an airtight room. The disposal of the mixture, such as the Example 1, for neutralizing the carbon dioxide and partially generating oxygen in one frame, and the mixture, such as the Example 2, nearly exclusively generating oxygen in another frame, enables exhaled air to be purified and regenerated.

The release of 212 litres of oxygen corresponds to a consumption of approximately ten hours per man. That of 233 litres corresponds to eleven hours. The neutralization of 144 litres of carbon dioxide corresponds to the production of carbon dioxide exhaled by one man during eight hours and that of 207 litres corresponds to his exhalation during eleven and one-half hours.

Taking into consideration the use of the products for twenty hours from the starting of the test and the purifying and regenerating of exhalation for one man during eleven hours shows that the amount required per hour for breathing is 0.4 kg.

In practice it will be further advantageous to prepare two mixtures, one primarily for liberating oxygen and the other for neutralizing carbon dioixide and liberating oxygen. These mixtures are preferably composed of ordinary commercial substances in the form of fine powders and of short asbestos fibres intimately mixed therewith in a dry atmosphere containing very little carbon dioxide, by industrial mixers of ordinary construction. The active fibrous material may be conveniently packaged for use in wire netting bags filled with the product consolidated, preferably in pellets, at a pressure of from 15 to 20 kgs. per square cm.

While various pressures may be employed the indicated pressure of 15 to 20 kgs. per square centimeter gives the best results. The bags may be placed in air-tight boxes so as to be kept free from humidity and atmospheric conditions until ready for use. At the time of use they may be conveniently suspended or arranged in convenient positions in the required number and when they have been used and exhausted they may be readily replaced by new ones. By humidifying the bags at the end of their service a new yield of oxygen and a new absorption of carbon dioxide can be obtained. It has been found that 250 to 300 grs. of product per man per hour are necessary for satisfactory regeneration.

The commingling of the material with the short asbestos fibers results in a dissemination of the material and the subjection to the action of the atmosphere of maximum regenerating and purifying surfaces and the maximum and continuous chemical reaction and at the same time prevents the material from accumulating in a solid mass and forming agglomerates and producing undesirable heat which have rendered other processes objectionable.

What is claimed is:

1. The method of regenerating exhaled air, containing carbon dioxide and water vapor, to render it fit for breathing, comprising subjecting the exhaled air to the action of a mixture of barium peroxide, ferrate of barium, sodium peroxide and manganate of barium.

2. The method of regenerating exhaled air, containing carbon dioxide and water vapor, to render it fit for breathing, comprising subjecting the exhaled air to the action of a mixture of sodium perborate and manganate of barium.

3. The method of regenerating exhaled air, containing carbon dioxide and water vapor, to render it fit for breathing, comprising subjecting the exhaled air to the action of a mixture of barium peroxide, ferrate of barium, sodium peroxide and manganate of barium and fibrous material.

4. The method of regenerating exhaled air, containing carbon dioxide and water vapor, to render it fit for breathing, comprising subjecting the exhaled air to the action of a mixture of sodium perborate, manganate of barium and fibrous material.

5. The method of regenerating carbonated air, to render it suitable for breathing, comprising contacting the air with a regenerating mixture comprised of an oxygen-containing substance selected from the group consisting of alkaline peroxides and per-salts, and an insoluble alkaline-earth manganate transformable by the carbon dioxide into a soluble permanganate, thereby to remove carbon dioxide of the air simultaneously with yielding oxygen.

6. The method of regenerating carbonated air, to render it suitable for breathing, comprising contacting the air with a regenerating mixture comprised of an oxygen-containing substance selected from the group consisting of alkaline peroxides and per-salts, an insoluble alkaline-earth manganate transformable by carbon dioxide into a soluble permanganate, an alkaline-earth ferrate and a fibrous substance dispersed throughout the mixture.

7. The method of regenerating impure air containing carbon dioxide in quantities rendering it unsuitable for breathing which comprises contacting the air in the presence of moisture with a regenerating mixture comprised of an oxygen-containing substance selected from the group consisting of alkaline peroxides and per-salts, and an insoluble alkaline-earth manganate, in a finely divided state.

8. The method of regenerating impure air containing carbon dioxide in quantities rendering it unsuitable for breathing which comprises contacting the air in the presence of moisture with a regenerating mixture comprised of an oxygen-containing substance selected from the group consisting of alkaline peroxides and per-salts, and an insoluble alkaline-earth manganate, in a finely divided state, and of short fibres of asbestos dispersed throughout the mixture.

9. A composition of matter for regenerating exhaled air comprising an oxygen-containing substance selected from the group consisting of alkaline peroxides and per-salts; an insoluble alkaline-earth manganate transformable by carbon dioxide into a soluble permanganate; and, a dispersing material, in intimate admixture with each other.

10. A composition of matter for regenerating exhaled air comprising an oxygen-containing substance selected from the group consisting of alkaline peroxides and per-salts; an insoluble alkaline-earth manganate transformable by carbon dioxide into a soluble permanganate; an alkaline-earth ferrate; and, a dispersing material, in intimate admixture with each other.

NICOLAS HERZMARK.